(12) United States Patent
Gan et al.

(10) Patent No.: US 11,339,065 B2
(45) Date of Patent: May 24, 2022

(54) APPARATUS FOR PRODUCING AQUEOUS PH- AND REDOX POTENTIAL-ADJUSTING SOLUTION

(71) Applicant: KURITA WATER INDUSTRIES LTD., Tokyo (JP)

(72) Inventors: Nobuko Gan, Tokyo (JP); Yu Fujimura, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 173 days.

(21) Appl. No.: 16/492,616

(22) PCT Filed: Sep. 12, 2017

(86) PCT No.: PCT/JP2017/032791
§ 371 (c)(1),
(2) Date: Sep. 10, 2019

(87) PCT Pub. No.: WO2018/179493
PCT Pub. Date: Oct. 4, 2018

(65) Prior Publication Data
US 2020/0048116 A1 Feb. 13, 2020

(30) Foreign Application Priority Data
Mar. 30, 2017 (JP) .............................. JP2017-068981

(51) Int. Cl.
*B01D 19/00* (2006.01)
*C02F 1/20* (2006.01)
(Continued)

(52) U.S. Cl.
CPC ............ *C02F 1/58* (2013.01); *B01D 19/00* (2013.01); *B01D 61/00* (2013.01); *B01F 23/20* (2022.01);
(Continued)

(58) Field of Classification Search
CPC ...... C02F 1/66; C02F 1/20; C02F 1/68; C02F 2103/04; C02F 2103/346; C02F 2209/40;
(Continued)

(56) References Cited

U.S. PATENT DOCUMENTS 4,320,180 A * 3/1982 Nozaki .................... H01M 8/18
429/418
5,635,053 A * 6/1997 Aoki ................. H01L 21/02052
205/746

(Continued)

FOREIGN PATENT DOCUMENTS

| CN | 101100744 | 1/2008 |
| CN | 101970137 | 2/2011 |

(Continued)

OTHER PUBLICATIONS

"International Search Report (Form PCT/ISA/210) of PCT/JP2017/032791," dated Nov. 21, 2017, with English translation thereof, pp. 1-4.

(Continued)

*Primary Examiner* — Joseph W Drodge
(74) *Attorney, Agent, or Firm* — JCIPRNET

(57) ABSTRACT

An apparatus has a platinum group metal carrying resin column provided in a supply line of ultrapure water, and has a pH adjuster injection device and a redox potential adjuster injection device provided in a later stage thereof. The apparatus has a membrane-type deaeration apparatus and a gas dissolving membrane apparatus sequentially provided in a later stage of the devices, and a discharge line communicates with the gas dissolving membrane apparatus. A pH meter and an ORP meter are each provided at some midpoint in the discharge line, and the pH meter and the ORP meter are connected to a control device. Then, the control device controls the amount of adjusters to be injected from the pH adjuster injection device and the redox potential adjuster (Continued)

injection device, on the basis of the measurement results of the pH meter and the ORP meter.

4 Claims, 4 Drawing Sheets

(51) Int. Cl.
  *C02F 1/58*    (2006.01)
  *C02F 1/68*    (2006.01)
  *B01D 61/00*   (2006.01)
  *B01F 23/20*   (2022.01)
  *C02F 1/00*    (2006.01)
(52) U.S. Cl.
  CPC ............... *C02F 1/008* (2013.01); *C02F 1/20* (2013.01); *C02F 1/68* (2013.01)
(58) Field of Classification Search
  CPC .......... C02F 2301/046; C02F 2303/185; C02F 1/686; C02F 2209/06; C02F 2209/04; C02F 1/685; C02F 1/70; C02F 1/72; C02F 1/722; C02F 9/00; C02F 2303/18; C02F 1/58; C02F 1/42; C02F 2001/422; C02F 1/008; H01L 21/304; H01L 21/02052; B01D 19/00; B01D 19/0005; B01D 19/0036; B01D 61/00; B01D 19/0031; B08B 3/10; B08B 3/12; B01F 3/04; B01F 15/0022; B01F 15/00285; B01F 3/04985; B01F 1/00
  See application file for complete search history.

(56) References Cited

U.S. PATENT DOCUMENTS

| | | | | |
|---|---|---|---|---|
| 6,021,791 | A * | 2/2000 | Dryer | B01D 61/002 134/100.1 |
| 6,290,777 | B1 | 9/2001 | Imaoka et al. | |
| 6,416,586 | B1 * | 7/2002 | Ohmi | B08B 3/08 134/1 |
| 2003/0094610 | A1 * | 5/2003 | Aoki | C01B 3/00 257/48 |
| 2003/0116174 | A1 * | 6/2003 | Park | C11D 7/02 134/1.3 |
| 2003/0132104 | A1 | 7/2003 | Yamashita et al. | |
| 2009/0127201 | A1 * | 5/2009 | Kobayashi | B01J 31/08 210/668 |
| 2010/0044311 | A1 * | 2/2010 | Kobayashi | B01D 61/16 210/638 |
| 2011/0024361 | A1 * | 2/2011 | Schwartzel | C02F 1/46109 210/739 |
| 2011/0042281 | A1 | 2/2011 | Tokoshima et al. | |
| 2011/0198236 | A1 * | 8/2011 | Sumita | C02F 1/4676 205/746 |
| 2016/0233082 | A1 | 8/2016 | Yano et al. | |
| 2017/0044029 | A1 * | 2/2017 | Nakano | B01D 61/58 |
| 2017/0327396 | A1 * | 11/2017 | Ikuno | B01D 15/363 |
| 2020/0017384 | A1 * | 1/2020 | Fujimura | C02F 1/20 |
| 2020/0048116 | A1 * | 2/2020 | Gan | C02F 1/20 |

FOREIGN PATENT DOCUMENTS

| | | |
|---|---|---|
| JP | H10128254 | 5/1998 |
| JP | 2000183015 | 6/2000 |
| JP | 2000216130 | 8/2000 |
| JP | 2001157879 | 6/2001 |
| JP | 2003205299 | 7/2003 |
| JP | 2005019876 | 1/2005 |
| JP | 2009219995 | 10/2009 |
| JP | 2010240641 | 10/2010 |
| TW | 201530640 | 8/2015 |
| WO | 2015045975 | 4/2015 |

OTHER PUBLICATIONS

Office Action of Taiwan Counterpart Application, with English translation thereof, dated Dec. 24, 2020, pp. 1-13.
Office Action of China Counterpart Application, with English translation thereof, dated Sep. 3, 2021, pp. 1-14.

* cited by examiner

APPARATUS FOR PRODUCING AQUEOUS PH- AND REDOX POTENTIAL-ADJUSTING SOLUTION

CROSS-REFERENCE TO RELATED APPLICATION

This application is a 371 application of an international PCT application serial no. PCT/JP2017/032791, filed on Sep. 12, 2017, which claims the priority benefit of Japan application JP2017-068981, filed on Mar. 30, 2017. The entirety of the abovementioned patent application is hereby incorporated by reference herein and made a part of this specification.

TECHNICAL FIELD

The present invention relates to an apparatus for producing an aqueous pH- and redox potential-adjusting solution that is used in a field of electronic industry and the like, and particularly relates to an apparatus for producing an aqueous pH- and redox potential-adjusting solution that can minimize the corrosion and dissolution of a semiconductor wafer on which a transition metal such as cobalt is exposed, while preventing an electrical charge of the wafer.

BACKGROUND ART

In a process of manufacturing an electronic component such as LSI, a step of treating an object to be treated is repeated which has a fine structure. Now, it is important for maintaining a quality of a product and improving the yield to clean a surface of a treated body such as a wafer or a substrate for the purpose of removing fine particles, organic substances, metals, natural oxide films and the like which adhere thereto, and thereby achieving and maintaining a high degree of cleanliness. This cleaning is performed with the use of a cleaning liquid, for example, such as a mixed liquid of sulfuric acid and a hydrogen peroxide solution, and a hydrofluoric acid solution; and after the cleaning, rinsing is performed with the use of ultrapure water. High purity is required for the ultrapure water and the chemical solution which are supplied in this rinse step and the like. Furthermore, in recent years, the number of cleaning times has increased due to the miniaturization of semiconductor devices, the diversification of materials, and the complication of processes.

Generally, an ultrapure water production apparatus is used for producing the ultrapure water, which includes a pretreatment system, a primary pure water system, and a secondary pure water system (subsystem). In the rinse step in a wafer production process or the like, which uses ultrapure water produced by such an ultrapure water production apparatus, as the purity of the ultrapure water is increased, the specific resistance thereof becomes higher; but it is known that there occurs a problem that when the ultrapure water having the high specific resistance is used, static electricity tends to be easily generated at the time of cleaning, and leads to an electrostatic discharge damage in an insulating film and the reattachment of the fine particles. For this reason, in recent years, a dilute chemical solution is used as rinse water, in which carbon dioxide gas or the like is dissolved into the ultrapure water, thereby the pH is adjusted and the static electricity is reduced, and the problems as described above are addressed.

SUMMARY OF THE INVENTION

Problems to be Solved by the Invention

However, the rinse water obtained by dissolving carbon dioxide and the like in the ultrapure water shows acidity, and accordingly there has been a problem that when a wafer is cleaned on which a transition metal such as copper or cobalt is exposed to one surface or the whole surface, the exposed transition metal results in being corroded even though the amount is very small, thereby reducing the semiconductor performance. As a countermeasure, an alkaline dilute solution in which ammonia is dissolved is used as a substitute for the acidic rinse solution, but it has been found that even though the wafer is rinsed with the use of ammonia water of the same concentration, there are cases where an effect of suppressing the corrosion of the transition metal is sufficiently obtained or where the effect is not obtained.

Then, the present inventors have examined factors concerning why the exposed transition metal is corroded by the rinse water in the cleaning of the wafer or the like, and as a result, have found that not only the pH of the rinse water but also a redox potential greatly affects the corrosion of the transition metal. Accordingly, it is desirable to be capable of accurately adjusting the pH and the redox potential of the cleaning water for wafers on which transition metals such as copper and cobalt are exposed, depending on the transition metal which is an object to be cleaned, but there has not been an apparatus for producing the dilute chemical solution, which can accurately adjust both of the pH and the redox potential.

The present invention is designed with respect to the above described problems, and an object is to provide an apparatus for producing an aqueous pH- and redox potential-adjusting solution of high purity, which can accurately adjust the pH and the redox potential.

Means for Solving the Problems

The present invention is designed with respect to the above described object, and provides an apparatus for producing an aqueous pH- and redox potential-adjusting solution, which includes: a mechanism for removing hydrogen peroxide, a pH adjuster injection device for adding a pH adjuster into ultrapure water, and an redox potential adjuster injection device for adding a redox potential adjuster that are sequentially provided in an ultrapure water supply line; pH measuring means and redox potential measuring means in a later stage of the pH adjuster injection device and the redox potential adjuster injection device; and control means that controls an amount of the pH adjuster to be added by the pH adjuster injection device and an amount of the redox potential adjuster to be added by the redox potential adjuster injection device, on the basis of the measured values of the pH measuring means and the redox potential measuring means (Invention 1).

The apparatus according to the invention (Invention 1) removes a very small amount of hydrogen peroxide contained in the ultrapure water by passing ultrapure water to the mechanism for removing hydrogen peroxide from the ultrapure water supply line; subsequently adds the pH adjuster and the redox potential adjuster so that the pH and the redox potential become a desired pH and redox potential to prepare the aqueous pH- and redox potential-adjusting solution; then controls amounts of the pH adjuster and the redox potential adjuster to be added on the basis of the measurement results by the pH measuring means and the redox potential measuring means by control means so that the pH and the redox potential become desired pH and redox potential, thereby eliminating an influence of dissolved hydrogen peroxide in raw water; and can produce an aqueous solution having the pH and redox potential desirably adjusted.

In the invention (invention 1), it is preferable that the pH adjuster is one or more selected from ammonia, sodium hydroxide, potassium hydroxide and TMAH (invention 2).

The apparatus according to the invention (invention 2) can adjust the pH of the aqueous pH- and redox potential-adjusting solution to an alkaline side.

In the invention (Invention 1 and 2), it is preferable that the redox potential adjuster is one or more selected from a hydrogen peroxide solution, ozone gas and oxygen gas (Invention 3).

The apparatus according to this invention (Invention 3) can adjust the redox potential of the aqueous pH- and redox potential-adjusting solution to a positive or a negative, by appropriately selecting the above substances.

In the above described inventions (Inventions 1 to 3), it is preferable that the redox potential adjuster is a hydrogen peroxide solution, and that a membrane-type deaeration apparatus is provided in a later stage of the pH adjuster injection device and the redox potential adjuster injection device, and in a former stage of the pH measuring means and the redox potential measuring means (Invention 4).

The apparatus according to the invention (Invention 4) can effectively deaerates a dissolved gas such as oxygen, which dissolves in the aqueous pH- and redox potential-adjusting solution, by the membrane-type deaeration apparatus, can reduce a concentration of dissolved oxygen in the obtained aqueous pH- and redox potential-adjusting solution, and accordingly can produce an adjusted solution of high purity, which has reflected the desired pH and redox potential.

In the above described invention (Invention 4), it is preferable that an inert gas dissolving apparatus is provided in a later stage of the membrane-type deaeration apparatus (Invention 5).

The apparatus according to the invention (Invention 5) dissolves an inert gas in the adjusted solution of the high purity, thereby makes it difficult for a gas component to dissolve again in the adjusted solution to be obtained, and can produce the adjusted solution of the high purity, which has maintained the desired pH and redox potential for a long period of time.

In the above described inventions (Inventions 1 to 5), it is preferable that the aqueous pH- and redox potential-adjusting solution having a pH of 9 to 13 and a redox potential of 0 to 1.7 V is produced (Invention 6).

The apparatus according to this invention (Invention 6) adjusts the pH and redox potential within the above range, and can produce an adjusted solution according to an object to be cleaned.

In the above described inventions (Inventions 1 to 6), it is preferable that the aqueous pH- and redox potential-adjusting solution is used for cleaning a semiconductor material on which a transition metal is exposed at least in part (Invention 7).

The apparatus according to the invention (Invention 7) can adjust the pH and the redox potential to those which can suppress the corrosion of the transition metal, according to the type of the transition metal such as cobalt, which is exposed.

Effect of the Invention

The apparatus for producing an aqueous pH- and redox potential-adjusting solution of the present invention removes a very small amount of hydrogen peroxide contained in ultrapure water; subsequently injects a pH adjuster and a redox potential adjuster to prepare an aqueous pH- and redox potential-adjusting solution; then controls the adjusted water to be obtained on the basis of measurement results of pH measurement means and redox potential measurement means so that the adjusted water obtains a desired pH and a redox potential; and can produce the aqueous pH- and redox potential-adjusting solution of a desired pH and redox potential. Thereby, it becomes possible to stably supply the adjusted solution that has maintained such a pH and redox potential as not to cause the corrosion in the transition metal which constitutes a member to be treated, such as cobalt.

EMBODIMENTS FOR CARRYING OUT THE INVENTION

Hereinafter, one embodiment of the apparatus for producing the aqueous pH- and redox potential-adjusting solution of the present invention will be described in detail with reference to the attached drawings.

[Apparatus for Producing Aqueous pH- and Redox Potential-Adjusting Solution]

Figure 1:
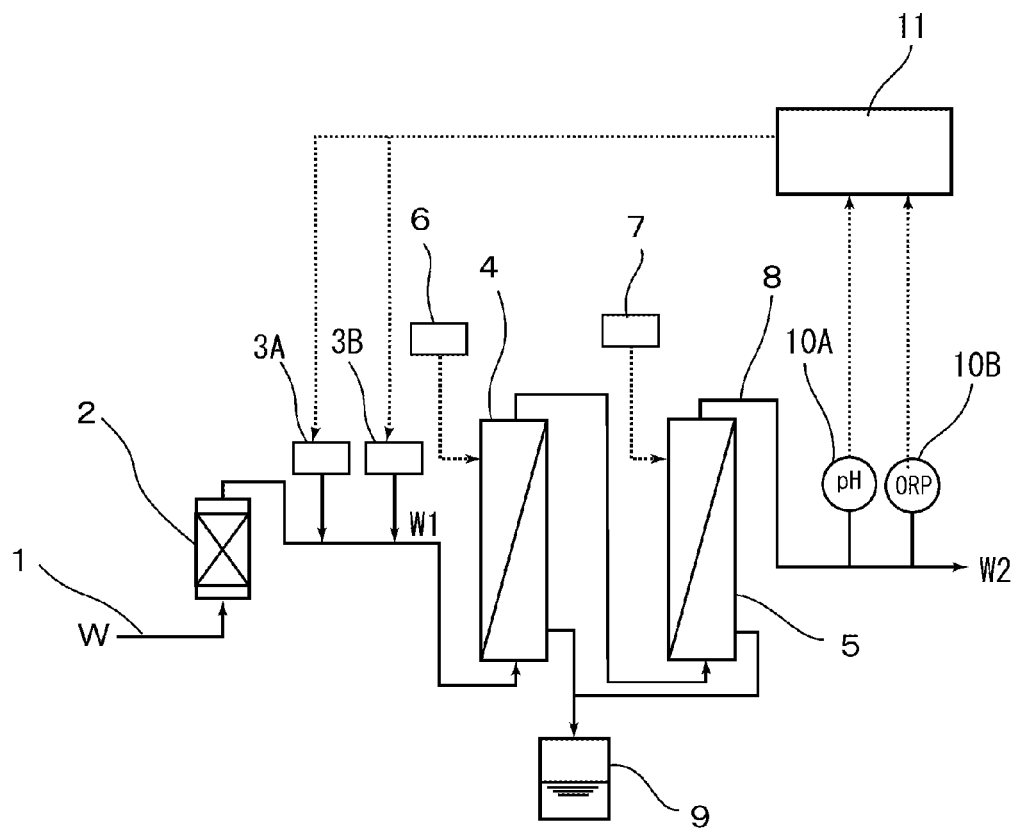
FIG. 1 is a schematic view showing an apparatus for producing an aqueous pH- and redox potential-adjusting solution according to one embodiment of the present invention.

FIG. 1 shows an apparatus for producing aqueous pH- and redox potential-adjusting solution. In FIG. 1, the apparatus for producing the adjusted water has a structure that has a platinum group metal carrying resin column 2 which is a mechanism for removing hydrogen peroxide, provided in a supply line 1 of ultrapure water W, and has a pH adjuster injection device 3A and an redox potential adjuster injection device 3B provided in a later stage thereof; and in the present embodiment, has a membrane-type deaeration apparatus 4 and a gas dissolving membrane apparatus 5 sequentially provided in a later stage of the pH adjuster injection device 3A and the redox potential adjuster injection device 3B. An inert gas source 6 is connected to a gaseous phase side of the membrane-type deaeration apparatus 4, and an inert gas source 7 is also connected to the gaseous phase side of the gas dissolving membrane apparatus 5; and a discharge line 8 communicates with the gas dissolving membrane apparatus 5. Incidentally, reference numeral 9 denotes a drain tank of the membrane-type deaeration apparatus 4 and the gas dissolving membrane apparatus 5. In addition, in the present embodiment, a pH meter 10A of pH measuring means and an ORP meter 10B of redox potential measuring means are each provided at some midpoint in the discharge line 8, and the pH meter 10A and the ORP meter 10B are connected to a control device 11 such as a personal computer. On the other hand, the control device 11 is also connected to the pH adjuster injection device 3A and the redox potential adjuster injection device 3B, and can control the amount of a chemical agent and the like to be injected from these devices 3A and 3B.

<Ultrapure Water>

In the present embodiment, it is preferable for ultrapure water W which is raw water to have, for example, resistivity: 18.1 MΩ·cm or higher, fine particles: 1000 pieces/L or less with particle size of 50 nm or larger, viable bacteria: 1 piece/L or less, TOC (Total Organic Carbon): 1 μg/L or less, total silicon: 0.1 μg/L or less, metals: 1 ng/L or less, ions: 10 ng/L or less, hydrogen peroxide: 30 μg/L or less, and water temperature: 25±2° C.

<Mechanism for Removing Hydrogen Peroxide>

In the present embodiment, a platinum group metal carrying resin column 2 is used as a mechanism for removing hydrogen peroxide.

(Platinum Group Metal)

In the present embodiment, examples of a platinum group metal carried on a platinum group metal carrying resin which is used for the platinum group metal carrying resin column 2 include ruthenium, rhodium, palladium, osmium, iridium and platinum. These platinum group metals can be used solely or in combination with one or more other types, and can also be used as an alloy of two or more types; or a purified product of a naturally produced mixture can also be used without separating the mixture into single substances. Among the metals, each one of the platinum, the palladium and the platinum/palladium alloy, or a mixture of two or more types thereof shows strong catalytic activity, and accordingly can be preferably used. In addition, nano-order fine particles of these metals can be particularly suitably used.

(Carrier Resin)

In the platinum group metal carrying resin column 2, as a carrier resin for carrying the platinum group metal thereon, an ion exchange resin can be used. Among the resins, an anion exchange resin can be particularly preferably used. The platinum group metal is negatively charged; and accordingly is stably carried on the anion exchange resin and resists exfoliating. It is preferable that an exchange group of the anion exchange resin has an OH form. An anion exchange resin having the OH form makes the resin surface alkaline and promotes a decomposition of hydrogen peroxide.

<pH Adjuster Injection Device 3A and Redox Potential Adjuster Injection Device 3B>

In the present embodiment, the injection devices are not limited in particular, and a general chemical solution injection device can be used. When the pH adjuster or the redox potential adjuster is liquid, a pump such as a diaphragm pump can be used. Alternatively, a pressurization type pump can also be preferably used which charges a pH adjuster or a redox potential adjuster in a closed container together with an inert gas such as $N_2$ gas, and pushes these adjusters by a pressure of the inert gas. When the pH adjuster or the redox potential adjuster is a gas, a direct gas-liquid contact device such as a gas permeable membrane module or an ejector can be used.

<pH Adjuster>

In the present embodiment, the pH adjuster which is injected from the pH adjuster injection device 3A is not limited in particular, and when the pH is adjusted to lower than pH 7, hydrochloric acid, nitric acid, sulfuric acid, hydrofluoric acid or the like can be used. In addition, when the pH is adjusted to pH 7 or higher, ammonia, sodium hydroxide, potassium hydroxide, TMAH or the like can be used. When the aqueous pH- and redox potential-adjusting solution is used as cleaning water for a wafer on which a transition metal such as copper and cobalt is exposed, it is preferable to adjust the aqueous pH- and redox potential-adjusting solution to an alkaline side, but a solution of an alkali metal such as sodium hydroxide is not suitable because of containing a metal component. Accordingly, in the present embodiment, ammonia shall be used.

<Redox Potential Adjuster>

In the present embodiment, the redox potential adjuster which is injected from the redox potential adjuster injection device 3B is not limited in particular, but potassium ferricyanide, potassium ferrocyanide and the like are not preferable because of containing a metal component. Accordingly, in order to adjust the redox potential to the positive side, it is possible to use a liquid such as a hydrogen peroxide solution or a gaseous body such as ozone gas or oxygen gas. In addition, in order to adjust the redox potential to the negative side, it is preferable to use a liquid such as oxalic acid or a gaseous body such as hydrogen. For example, when the aqueous pH- and redox potential-adjusting solution is used as cleaning water for the wafer on which a transition metal such as copper or cobalt is exposed, it is preferable to adjust the redox potential to a positive value so as to suppress the elution of these materials, but when the dissolved oxygen and the like are removed by the membrane-type deaeration apparatus 4 in a later stage as in the present embodiment, the gaseous body is not suitable, and accordingly the hydrogen peroxide solution shall be used.

<Membrane-Type Deaeration Apparatus>

In the present embodiment, as the membrane-type deaeration apparatus 4, such an apparatus can be used as to flow ultrapure water W in one side (liquid phase side) of a deaeration membrane, and exhaust the other side (gaseous phase side) by a vacuum pump, thereby to make dissolved oxygen permeate through the membrane and migrate to the gaseous phase chamber side, and to remove the dissolved oxygen. Incidentally, it is preferable to connect an inert gas source 6 of nitrogen or the like in the vacuum side (gaseous phase side) of this membrane and improve the deaeration performance. The deaeration membrane is acceptable as long as gases such as oxygen, nitrogen and steam pass therethrough but water does not pass therethrough; and examples of the deaeration membrane include a silicone rubber-based deaeration membrane, a polytetrafluoroethylene-based deaeration membrane, a polyolefin-based deaeration membrane and a polyurethane-based deaeration membrane. Various commercially available membranes can be used as the deaeration membrane.

<Gas Dissolving Membrane Apparatus>

In the present embodiment, the gas dissolving membrane apparatus 5 is not limited in particular as long as the device flows ultrapure water W in one side (liquid phase side) of the gas permeable membrane, passes gas in the other side (gaseous phase side), and transfers the gas to the liquid phase side to dissolve the gas in the liquid; and can use polymer membranes of, for example, polypropylene, polydimethylsiloxane, a polycarbonate-polydimethylsiloxane block copolymer, a polyvinylphenol-polydimethylsiloxane-polysulfone block copolymer, poly(4-methylpentene-1), poly(2,6-dimethylphenylene oxide) and polytetrafluoroethylene. In the present embodiment, an inert gas such as nitrogen is used as the gas to be dissolved in the water, and this inert gas is supplied from the inert gas source 7.

[Method for Producing Aqueous pH- and Redox Potential-Adjusting Solution]

A method for producing an adjusted solution of high purity by use of an apparatus for producing an aqueous pHand redox potential-adjusting solution of the present embodiment is described hereunder, which has a structure as described above.

Firstly, ultrapure water W of raw water is supplied from a supply line 1 to the platinum group metal carrying resin column 2. In this platinum group metal carrying resin column 2, the platinum group metal decomposes and removes hydrogen peroxide in the ultrapure water W by the catalytic action thereof, in other words, functions as the mechanism for removing hydrogen peroxide. However, in this case, there is a case in which the dissolved oxygen in the ultrapure water W shows a tendency of slight increase due to the decomposition of hydrogen peroxide.

Next, a pH adjuster is injected into the ultrapure water W from the pH adjuster injection device 3A, and a redox potential adjuster is injected from the redox potential adjuster injection device 3B to prepare an adjusted solution W1. As for the amounts (flow rates) of the pH adjuster and the redox potential adjuster to be injected, it is acceptable to control the injection amounts so that the adjusted solution W1 to be obtained has a desired pH and redox potential, according to the flow rate of the ultrapure water W by control device 11 of control means. For example, when the aqueous pH- and redox potential-adjusting solution is used as cleaning water for a wafer on which a transition metal such as copper or cobalt is exposed, the injection amount may be controlled so that the redox potential becomes 0 to 1.7 V at pH 9 to 13. Here, the adjusted solution W1 results in containing the dissolved oxygen in the ultrapure water W and the dissolved oxygen introduced from the pH adjuster and the redox potential adjuster.

Subsequently, this adjusted solution W1 is supplied to the membrane-type deaeration apparatus 4. In the membrane-type deaeration apparatus 4, the adjusted solution W1 is passed to a liquid phase chamber side of the liquid phase chamber and the gaseous phase chamber which are composed by a hydrophobic gas permeable membrane, and the gaseous phase chamber is also depressurized by a not-shown vacuum pump; and thereby a dissolved gas such as dissolved oxygen, which is contained in the adjusted solution W1, is migrated to the gaseous phase chamber through the hydrophobic gas permeable membrane, and is thereby removed. At this time, the condensed water which is produced in the gaseous phase chamber side is collected in a drain tank 9. In the present embodiment, an inert gas is supplied to the gaseous phase chamber of the membrane-type deaeration apparatus 4 from the inert gas source 6 under a reduced pressure as a sweep gas, but the supply of the inert gas is desirable in the point that thereby the deaeration effect is enhanced and an effect of removing the dissolved oxygen for the adjusted solution W1 is further enhanced. The inert gas is not limited in particular, and a rare gas, a nitrogen gas or the like can be used. In particular, nitrogen can be suitably used, because of being readily available and inexpensive even at high purity levels. Thereby, the supply of the inert gas can decrease the concentration of the dissolved oxygen in the adjusted solution W1 to a very low level. Thus, the pH adjuster and the redox potential adjuster are not directly deaerated but are deaerated after the adjusted solution W1 has been produced, and thereby the risk of the leakage of the chemical solution and the like can be reduced at the time when these adjusters are vacuum deaerated.

Then, in the present embodiment, the deaerated adjusted solution W1 is supplied to the gas dissolving membrane apparatus 5. In the gas dissolving membrane apparatus 5, the adjusted solution W1 is passed in the liquid phase chamber side of the liquid phase chamber and the gaseous phase chamber which are composed by the hydrophobic gas permeable membrane, and also an inert gas is supplied to the gaseous phase chamber from the inert gas source 7 under such a condition that a pressure in the gaseous phase chamber side becomes higher than that of the liquid phase chamber, and thereby the inert gas is transferred to the liquid phase chamber side to be dissolved in the adjusted solution W1; and a final adjusted solution (adjusted cleaning solution) W2 can be obtained. At this time, the condensed water which is produced in the gaseous phase chamber side is collected in the drain tank 9. The dissolution of the inert gas can suppress the re-dissolution of the gas species into the adjusted cleaning solution W2, and the adjusted cleaning solution W2 can be maintained in a state in which dissolved oxygen is decreased. The inert gas is not limited in particular, and a rare gas, a nitrogen gas or the like can be used. In particular, nitrogen can be suitably used, because of being readily available and inexpensive even at high purity levels. Such a method using a gas dissolving membrane module can easily dissolve the inert gas in water, and also can adjust and manage the concentration of the dissolved gas.

In the present embodiment, a pH of the adjusted cleaning solution W2 is measured with the pH meter 10A, and a redox potential thereof is measured by the ORP meter 10B, and it is monitored whether or not the adjusted cleaning solution W2 has the desired pH and the redox potential. The pH and the redox potential fluctuate even by a slight fluctuation of the supplied amount of the ultrapure water W, and accordingly the control device 11 is structured so as to be capable of controlling the injection amounts of the pH adjuster injection device 3A and the redox potential adjuster injection device 3B so that the adjusted cleaning solution W2 has a desired pH and the redox potential. The pH and the redox potential can be controlled by known methods, in addition to feedback control such as PI control and PID control.

The adjusted cleaning solution W2 to be produced by the present embodiment as described above is supplied to a washing machine for electronic materials such as a silicon substrate for a semiconductor, a glass substrate for a liquid crystal, or a quartz substrate for a photomask. Such an adjusted cleaning solution W2 not only has the desired pH and redox potential as described above, but also can be controlled to such very low levels that the hydrogen peroxide concentration is 1 ppb or lower and the dissolved oxygen concentration is 100 ppb or lower; and can suppress the re-dissolution of gas species into itself to maintain the low state, and can keep itself in a suitable state for cleaning.

In the above, the present invention has been described with reference to the accompanying drawings, but the present invention is not limited to the above described embodiment, and various modifications can be made. For example, instruments such as a flow meter, a thermometer, a pressure gauge, and a gas concentration meter can be provided at an arbitrary place. In addition, it is also acceptable to provide control valves for flow of chemical solutions on a pH adjuster injection device 3A and a redox potential adjuster injection device 3B, and to provide control devices such as a gas flow control valve on the inert gas source 6 and the inert gas source 7, as needed. Furthermore, the membrane-type deaeration apparatus 4 and the gas dissolving membrane apparatus 5 may not be necessarily provided depending on a required water quality of the adjusted solution, and in this case, a gaseous body can be used as the pH adjuster and the redox potential adjuster.

EXAMPLE

The invention will be described further in detail with reference to the following specific examples.

Confirmation Test 1 for Effect of Redox Potential

Test Example 1-1

A test piece with a rectangular shape of 10 mm×45 mm was cut out from a wafer of 300 mm Φ for an ELD provided with a Co film. This test piece was immersed in 100 mL of ammonia water (ammonia concentration: 1 ppm, pH of 9.4 and redox potential of 0.2 V) at room temperature for 20 minutes, then the concentration of cobalt in the above treatment liquid was analyzed by ICP-MS, and a dissolution rate of the cobalt was calculated. The results are shown in FIG. 2.

Test Example 1-2

The same test piece as that of Test Example 1-1 was immersed in 100 mL of ammonia water added with hydrogen peroxide (ammonia concentration: 1 ppm, hydrogen peroxide concentration: 10 ppm, pH of 10.0 and redox potential of 0.4 V) at room temperature for 20 minutes, then the concentration of cobalt in the above treatment liquid was analyzed by ICP-MS, and the dissolution rate of the cobalt was calculated. The results are shown together in FIG. 2.

Figure 2:
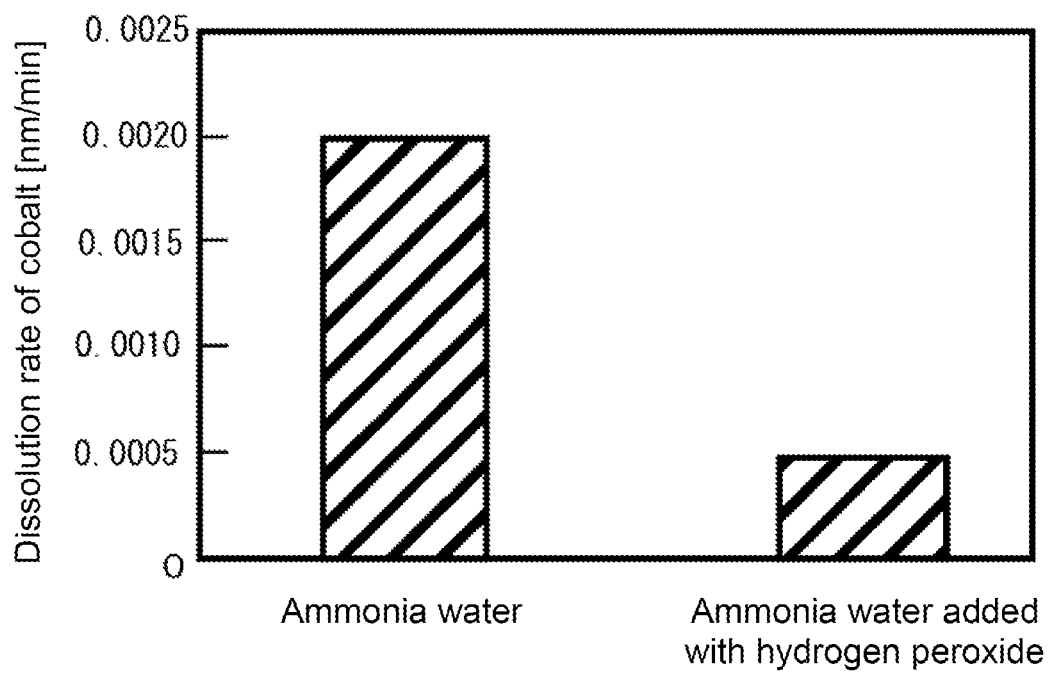
FIG. 2 is a graph showing a dissolution rate of cobalt in Test Example 1.

As is apparent from FIG. 2, it has been confirmed that the dissolution rate of cobalt is greatly reduced to approximately ¼ by the addition of a hydrogen peroxide solution even though the concentrations of ammonia water are the same. This is considered to be because cobalt oxide (CoO) is formed on the surface of the wafer by a reaction of $$Co+H_2O_2 \rightarrow CoO+H_2O, \text{ and}$$

the cobalt oxide acts as a stable passive film under the alkaline condition.

Confirmation Test 2 for Effect of Redox Potential

Test Example 2

A test piece with a rectangular shape of 10 mm×45 mm was cut out from a wafer of 300 mm Φ for an ELD provided with a Co film. This test piece was immersed in 100 mL of ammonia water added with hydrogen peroxide (ammonia concentration: 1 ppm, hydrogen peroxide concentration: 0.001 ppm to 1000 ppm, and redox potential of 0.2 V to 1.6 V) at room temperature for 20 minutes, then the concentration of cobalt in the above treatment liquid was analyzed by ICP-MS, and the dissolution rate of the cobalt was calculated. The results are shown together in FIG. 3.

Figure 3:
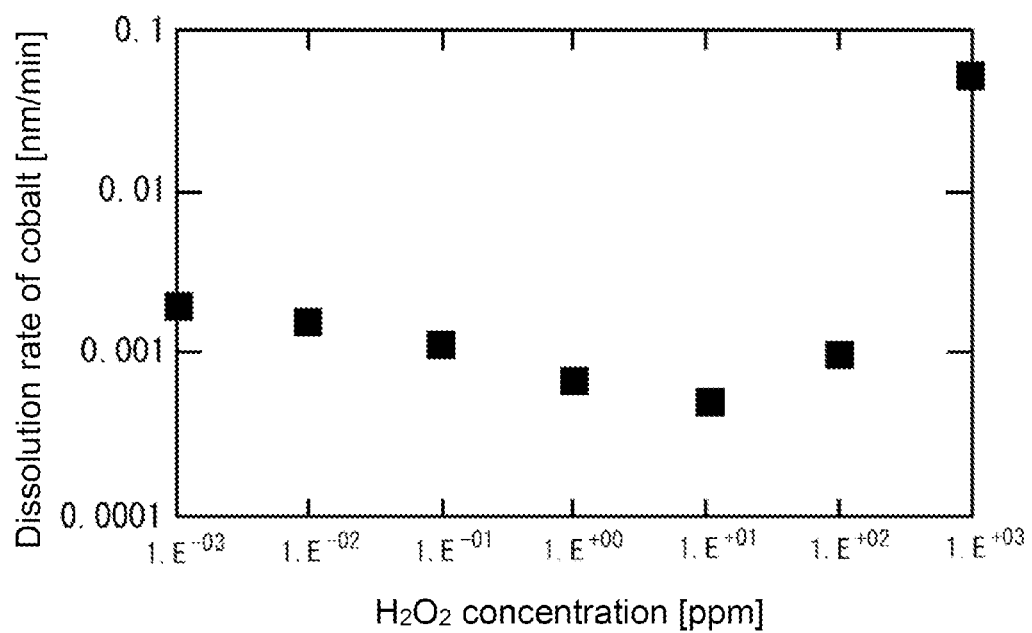
FIG. 3 is a graph showing a relationship between a concentration of hydrogen peroxide and the dissolution rate of cobalt in Test Example 2.

As is apparent from FIG. 3, even though the concentrations of ammonia water are the same, the dissolution rate of the cobalt greatly fluctuates according to the amount of the added hydrogen peroxide solution, and has become as greatly large as approximately 30 times at 1000 ppm, as compared to the case of 1 ppm of the ammonia concentration (Test example 1-1). From this result, it has been revealed that the dissolution rate of the cobalt greatly fluctuates due to the change of the redox potential under the alkaline environment.

This is considered to be because in the case when the hydrogen peroxide concentration is 100 ppm (redox potential of 0.5 V or lower), cobalt oxide (CoO) is formed on the surface of the wafer by the reaction of $$Co+H_2O_2 \rightarrow CoO+H_2O \quad (1), \text{and}$$

the cobalt oxide acts as the stable passive film under the alkaline condition.

On the other hand, it is considered in the case where the hydrogen peroxide concentration is 1000 ppm (redox potential of 1.6 V), the following reaction formulae sequentially progress because of the abundant hydrogen peroxide, and cobalt is ionized and elutes.

$$Co+H_2O_2 \rightarrow CoO+H_2O \quad (1)$$

$$3CoO+H_2O_2 \rightarrow Co_3O_4+H_2O \quad (2)$$

$$2Co_3O_4+H_2O_2 \rightarrow 3Co_2O_3+H_2O \quad (3)$$

$$2Co_2O_3+5H_2O_2 \rightarrow 4CoO_4^{2-}+5H_2 \quad (4)$$

Confirmation Test 3 for Effect of Redox Potential

Test Example 3-1

A test piece with a rectangular shape of 10 mm×45 mm was cut out from a wafer of 300 mm Φ for an ELD provided with a Co film. In addition, a test piece with a rectangular shape of 10 mm×45 mm was cut out from a wafer of 300 mm (I) for an ELD provided with a Cu film. These two test pieces were electrically connected and were immersed in 100 mL of ammonia water (ammonia concentration: 1 ppm, pH of 9.4 and redox potential of 0.2 V) at room temperature for 20 minutes, then the concentration of cobalt in the above treatment liquid was analyzed by ICP-MS, and the dissolution rate of the cobalt was calculated. The result is shown in FIG. 4.

Test Example 3-2

The same test pieces as those of Test Example 3-1 were immersed in 100 mL of ammonia water added with hydrogen peroxide (ammonia concentration: 1 ppm, hydrogen peroxide concentration: 10 ppm, pH of 10.0 and redox potential of 0.4 V) at room temperature for 20 minutes, then the concentration of cobalt in the above treatment liquid was analyzed by ICP-MS, and the dissolution rate of the cobalt was calculated. The result is shown together in FIG. 4.

Figure 4:
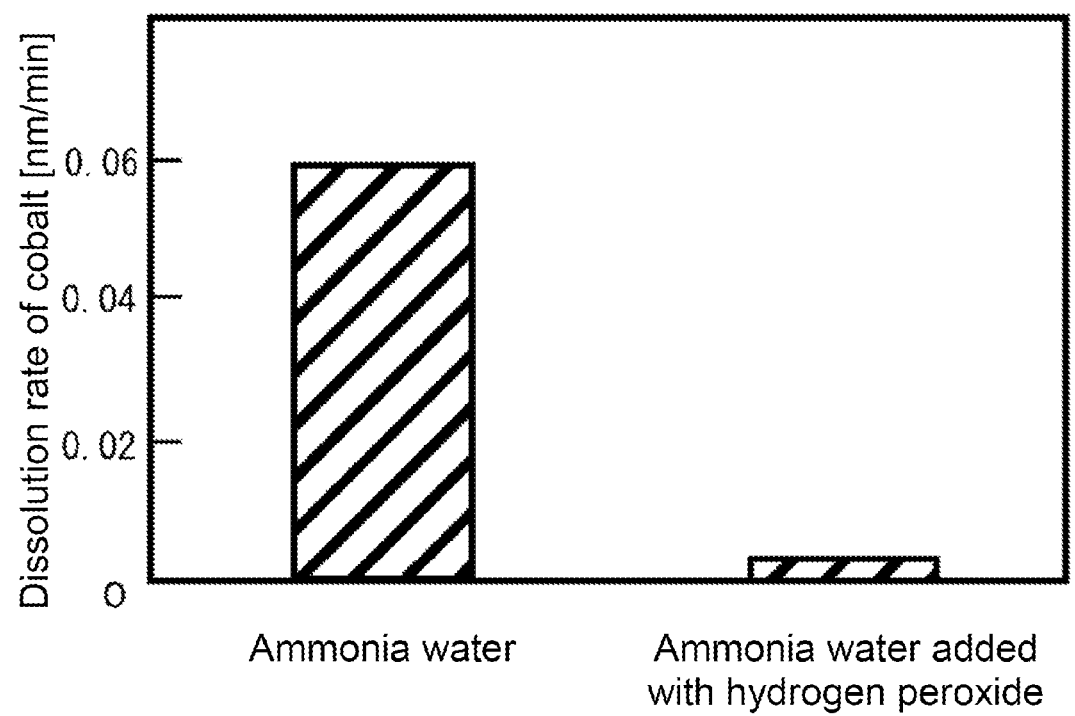
FIG. 4 is a graph showing the dissolution rate of cobalt in Test Example 3.

As is apparent from FIG. 4, in the state in which different metals (cobalt and copper) are electrically connected to each other, the dissolution rate of the cobalt greatly increases in Test Example 3-1 as compared to Test Example 1-1. Incidentally, the elution of the copper was hardly recognized. This is considered to be because galvanic corrosion occurs due to the difference between the redox potentials of both metals, and the cobalt having a low redox potential becomes easy to dissolve. On the other hand, it has been confirmed that the dissolution rate of the cobalt is greatly reduced by the addition of the hydrogen peroxide solution even though the concentrations of ammonia water are the same. This is considered to be because passive films of oxides are formed on the surfaces of both cobalt and copper, respectively, by hydrogen peroxide.

As is apparent from these Test Examples 1 to 3, it has been revealed that in order to suppress the elution of a transition metal from a member to be processed when the member to be processed has been washed on which the transition metal such as cobalt is exposed, it is effective to control the pH and the redox potential of the cleaning water.

EXAMPLE 1

An apparatus for producing the adjusted solution was configured as in the configuration shown in FIG. 1; ultrapure water W was supplied from a supply line 1 at a flow rate of 3 L/min, and was passed to a platinum group metal carrying resin column 2 which carried platinum as a platinum group metal thereon, then an aqueous ammonia solution (concentration of 28 wt %) was supplied from the pH adjuster injection device 3A so that the pH was in a range of 9.5 to 10.2, and at the same time, a hydrogen peroxide solution (concentration of 5 wt %) was supplied from the redox potential adjuster injection device 3B so that the redox potential was 0.4 V at a hydrogen peroxide concentration of 10 ppm; and the adjusted solution W1 was prepared. The adjusted solution W1 was treated in a membrane-type deaeration apparatus 4 and a gas dissolving membrane apparatus 5, and an adjusted cleaning solution W2 was produced. The pH of this adjusted cleaning solution W2 was measured with a pH meter 10A and a redox potential was measured with an ORP meter 10B, and the control device 11 controlled an amount of chemicals injected from the pH adjuster injection device 3A and the redox potential adjuster injection device 3B by PID, while following fluctuations of the pH and the redox potential due to the fluctuation of the flow rate of the ultrapure water W, and the like. Furthermore, the concentration of hydrogen peroxide ($H_2O_2$) was measured with a hydrogen peroxide concentration meter. The results are shown in Table 1 together with the dissolved oxygen concentration of the adjusted cleaning solution W2.

Incidentally, Liqui-Cel (made by Celgard LLC) was used as the membrane-type deaeration apparatus 4, and nitrogen gas was circulated at a flow rate of 10 L/min as a sweep gas. In addition, "MHF 1704" made by Mitsubishi Rayon Co., Ltd. was used as the gas dissolving membrane apparatus 5, and nitrogen gas was supplied at a flow rate of 0.1 L/min.

COMPARATIVE EXAMPLE 1

Figure 5:
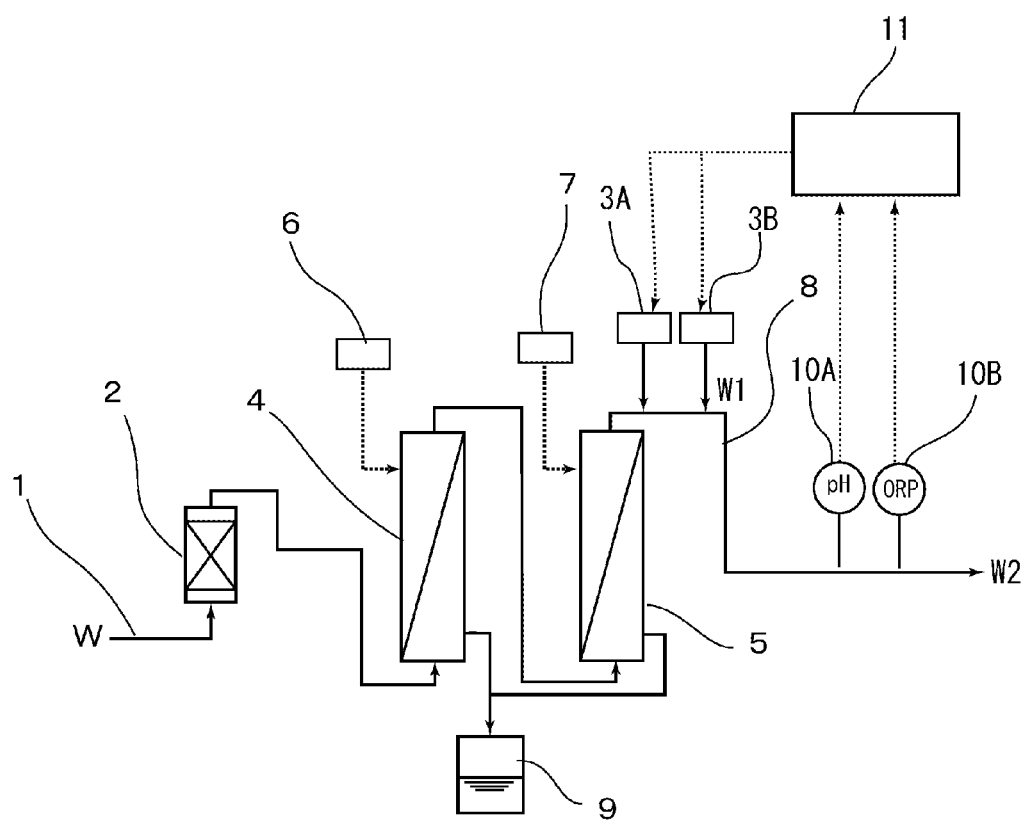
FIG. 5 is a schematic view showing an apparatus for producing an aqueous pH- and redox potential-adjusting solution, in Comparative Example 1.

As is shown in FIG. 5, an apparatus for producing an adjusted solution was configured similarly to the apparatus shown in FIG. 1, except that in a rear stage of the gas dissolving membrane apparatus 5 in the apparatus shown in FIG. 1, the aqueous ammonia solution (concentration of 28 wt %) was supplied from the pH adjuster injection device 3A so that the pH was in a range of 9.5 to 10.2, and also an aqueous hydrogen peroxide solution (concentration of 5 wt %) was supplied from the redox potential adjuster injection device 3B so that the redox potential was 0.4 V at a hydrogen peroxide concentration of 10 ppm; and an adjusted solution W1 was prepared. An adjusted cleaning solution W2 was produced by this apparatus for producing the adjusted solution on the same conditions as those in Example 1. The pH of this adjusted cleaning solution W2 was measured with a pH meter 10A and a redox potential was measured with an ORP meter 10B, and a control device 11 controlled an amount of chemicals injected from the pH adjuster injection device 3A and the redox potential adjuster injection device 3B by PID, while following fluctuations of the pH and the redox potential due to the fluctuation of the flow rate of the ultrapure water W. Furthermore, the concentration of hydrogen peroxide ($H_2O_2$) was measured with a hydrogen peroxide concentration meter. The results are shown in Table 1 together with the dissolved oxygen concentration of the adjusted cleaning solution W2.

COMPARATIVE EXAMPLE 2

An adjusted cleaning solution W2 was produced similarly to that in Comparative Example 1, except that an aqueous ammonia solution (concentration of 28 wt %) was supplied from the pH adjuster injection device 3A in the apparatus of FIG. 5 so that the pH was in a range of 7.4 to 9.5, without supplying a hydrogen peroxide solution from the pH adjuster injection device 3A, and the hydrogen peroxide solution was not supplied from the redox potential adjuster injection device 3B, in Comparative Example 1. The pH of this adjusted cleaning solution W2 was measured with a pH meter 10A and a redox potential was measured with an ORP meter 10B, and the control device 11 controlled an amount of chemicals injected from the pH adjuster injection device 3A and the redox potential adjuster injection device 3B by PID, while following fluctuations of the pH and the redox potential due to the fluctuation of the flow rate of the ultrapure water W. Furthermore, the concentration of hydrogen peroxide ($H_2O_2$) was measured with a hydrogen peroxide concentration meter. The results are shown in Table 1 together with the dissolved oxygen concentration of the adjusted cleaning solution W2. Incidentally, a pH, a redox potential and a dissolved oxygen concentration of the ultrapure water W are shown in Table 1, which is a reference example for comparison.

TABLE 1

| | Example No. | | | |
|---|---|---|---|---|
| | Example 1 | Comparative Example 1 | Comparative Example 2 | Reference Example |
| Dissolved oxygen concentration | <100 ppb | >1 ppm | >1 ppm | <100 ppb |
| pH | 9.6 | 8.8 | 8.5 | 6.8 |
| ORP | +0.4 V | +0.4 V | +0.2 V | +0.2 V |
| $H_2O_2$ concentration | 9.8 ppm | 9.7 ppm | <0.001 ppm | <0.001 ppm |

As is apparent from Table 1, the apparatus for producing the aqueous pH- and redox potential-adjusting solution in Example 1 has been capable of controlling the dissolved oxygen concentration to be lower than 100 ppb, the pH to be within a target range, and the ORP and the hydrogen peroxide concentration to be values very close to the target value. On the other hand, in the apparatus for producing the adjusted solution in Comparative Example 1, the hydrogen peroxide has been close to the target value, but the dissolved oxygen concentration has been 1 ppm or higher, and the pH has been smaller than the target value due to the above result. This is considered to be a result affected by the dissolved oxygen that dissolves in the aqueous ammonia solution and the hydrogen peroxide solution which are supplied from the pH adjuster injection device 3A and the redox potential adjuster injection device 3B, respectively. In addition, in Comparative Example 2, the hydrogen peroxide solution has not been added, but the dissolved oxygen concentration has been 1 ppm or higher, and the pH has also been smaller than the target value.

DESCRIPTION OF REFERENCE SYMBOLS

1 Supply line
2 Platinum group metal carrying resin column (mechanism for removing hydrogen peroxide)
3A pH adjuster injection device
3B Redox potential adjuster injection device
4 Membrane-type deaeration apparatus
5 Gas dissolving membrane apparatus
6 Inert gas source
7 Inert gas source
8 Discharge line
9 Drain tank
10A pH meter (pH measuring means)
10B ORP meter (Redox potential measuring means)
11 Control device
W Ultrapure water
W1 Adjusted solution
W2 Adjusted cleaning solution

The invention claimed is:

1. An apparatus for producing an aqueous pH- and redox potential-adjusting solution, comprising: a mechanism for removing hydrogen peroxide, a pH adjuster injection device for adding a pH adjuster into ultrapure water, and a redox potential adjuster injection device for adding a redox potential adjuster, which are sequentially provided in an ultrapure water supply line, and an adjusted solution is obtained by adding the pH adjuster and the redox potential adjuster into ultrapure water;

a membrane type deaeration apparatus for receiving the adjusted solution adjusted by the pH adjuster injection device and the redox potential adjuster injection device, wherein the membrane type deaeration apparatus includes a liquid phase chamber for passing the adjusted solution and a gaseous phase chamber for removing a gas dissolved in the adjusted solution composed by a hydrophobic gas permeable membrane;

pH measuring means and redox potential measuring means for measuring the adjusted solution deaerated by the membrane type deaeration apparatus; and control means that controls an amount of the pH adjuster to be added by the pH adjuster injection device and an amount of the redox potential adjuster to be added by the redox potential adjuster injection device, on the basis of measured values of the pH measuring means and the redox potential measuring means, wherein the redox potential adjuster is a hydrogen peroxide solution, and wherein the aqueous pH- and redox potential-adjusting solution is obtained by passing ultrapure water through the mechanism for removing hydrogen peroxide, the pH adjuster injection device, the redox potential adjuster injection device, the pH measuring means and the redox potential measuring means.

2. The apparatus for producing the aqueous pH- and redox potential-adjusting solution according to claim 1, wherein the pH adjuster is one or more selected from ammonia, sodium hydroxide, potassium hydroxide and TMAH.

3. The apparatus for producing the aqueous pH- and redox potential-adjusting solution according to claim 1, comprising a gas dissolving membrane apparatus for receiving the adjusted solution deaerated by the membrane type deaeration apparatus.

4. The apparatus for producing the aqueous pH- and redox potential-adjusting solution according to claim 1, wherein the produced aqueous pH- and redox potential-adjusting solution has a pH of 9 to 13 and a redox potential of 0 to 1.7 V.

* * * * *